United States Patent [19]

Miller

[11] Patent Number: 5,135,638
[45] Date of Patent: Aug. 4, 1992

[54] WAX ISOMERIZATION USING CATALYST OF SPECIFIC PORE GEOMETRY

[75] Inventor: Stephen J. Miller, San Francisco, Calif.

[73] Assignee: Chevron Research and Technology Company, San Francisco, Calif.

[21] Appl. No.: 556,946

[22] Filed: Jul. 20, 1990

Related U.S. Application Data

[63] Continuation-in-part of Ser. No. 311,969, Feb. 17, 1989, abandoned.

[51] Int. Cl.$^5$ .................... C10G 47/16; C10G 47/18
[52] U.S. Cl. ........................... 208/27; 208/18; 208/97; 208/111; 208/112; 585/739; 585/740
[58] Field of Search .................... 208/27, 18, 111, 112; 585/734, 739, 740, 750

[56] References Cited

U.S. PATENT DOCUMENTS

| | | | |
|---|---|---|---|
| 4,686,029 | 8/1987 | Pellet et al. | 208/27 |
| 4,867,862 | 9/1989 | Ziemer | 208/99 |
| 4,906,351 | 3/1990 | Pellet et al. | 585/640 |
| 4,921,594 | 5/1990 | Miller | 208/111 |
| 4,956,521 | 9/1990 | Volles | 585/739 |
| 4,975,177 | 12/1990 | Garwood et al. | 208/27 |
| 4,986,894 | 1/1991 | Keville et al. | 208/27 |
| 4,992,159 | 2/1991 | Cody et al. | 208/27 |

*Primary Examiner*—Anthony McFarlane
*Attorney, Agent, or Firm*—Fliesler, Dubb, Meyer & Lovejoy

[57] ABSTRACT

The present invention relates to a process for producing a lube oil having a low pour point and excellent viscosity and viscosity index comprising isomerizing a waxy feed over a catalyst comprising a molecular sieve having generally oval 1-D pores having a minor axis between about 4.2 Å and about 4.8 Å and a major axis between about 5.4 Å and about 7.0 Å and at least one group VIII metal. SAPO-11, SAPO-31, SAPO-41, ZSM-22, ZSM-23 and ZSM-35 are examples of useful catalysts.

35 Claims, 3 Drawing Sheets

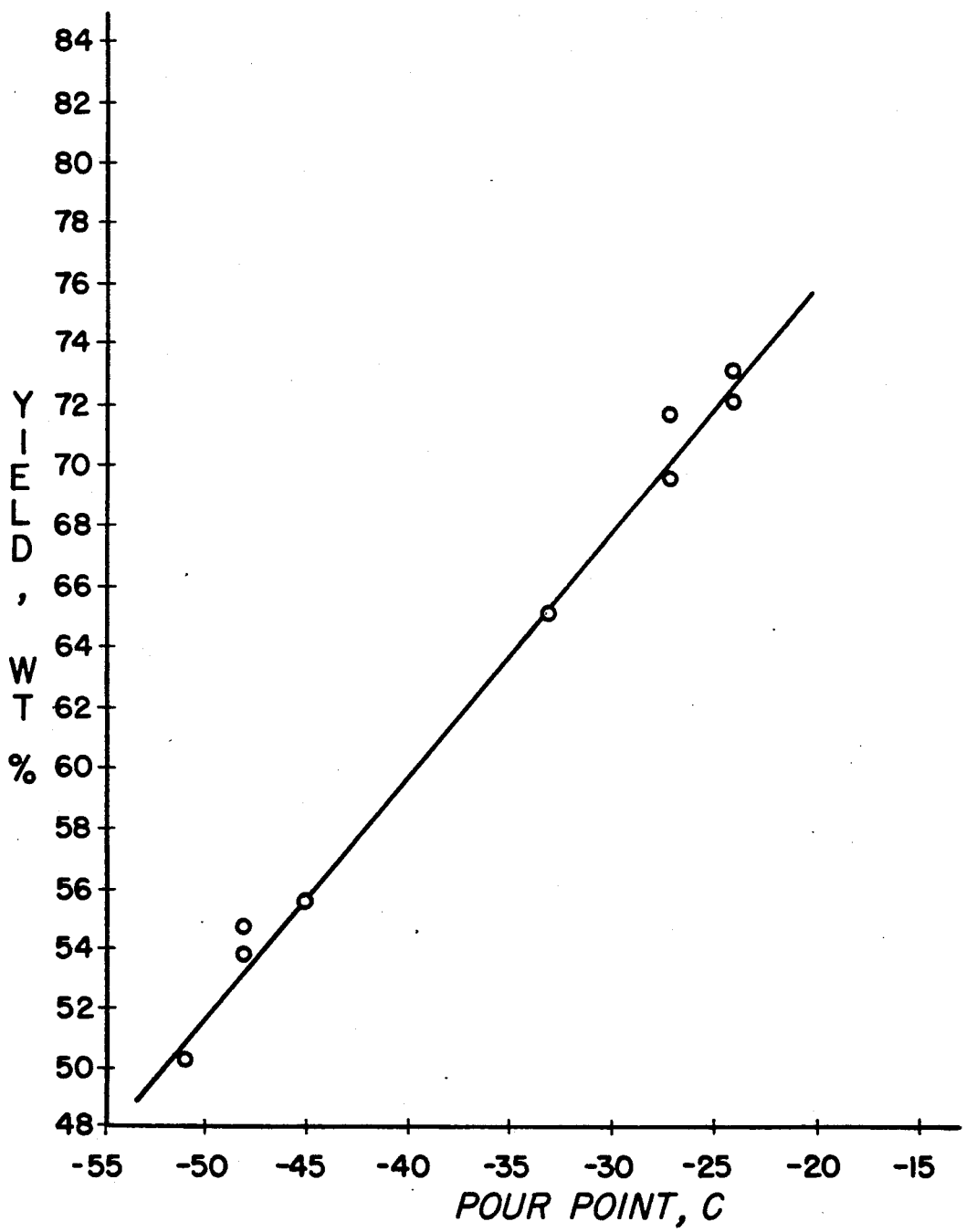

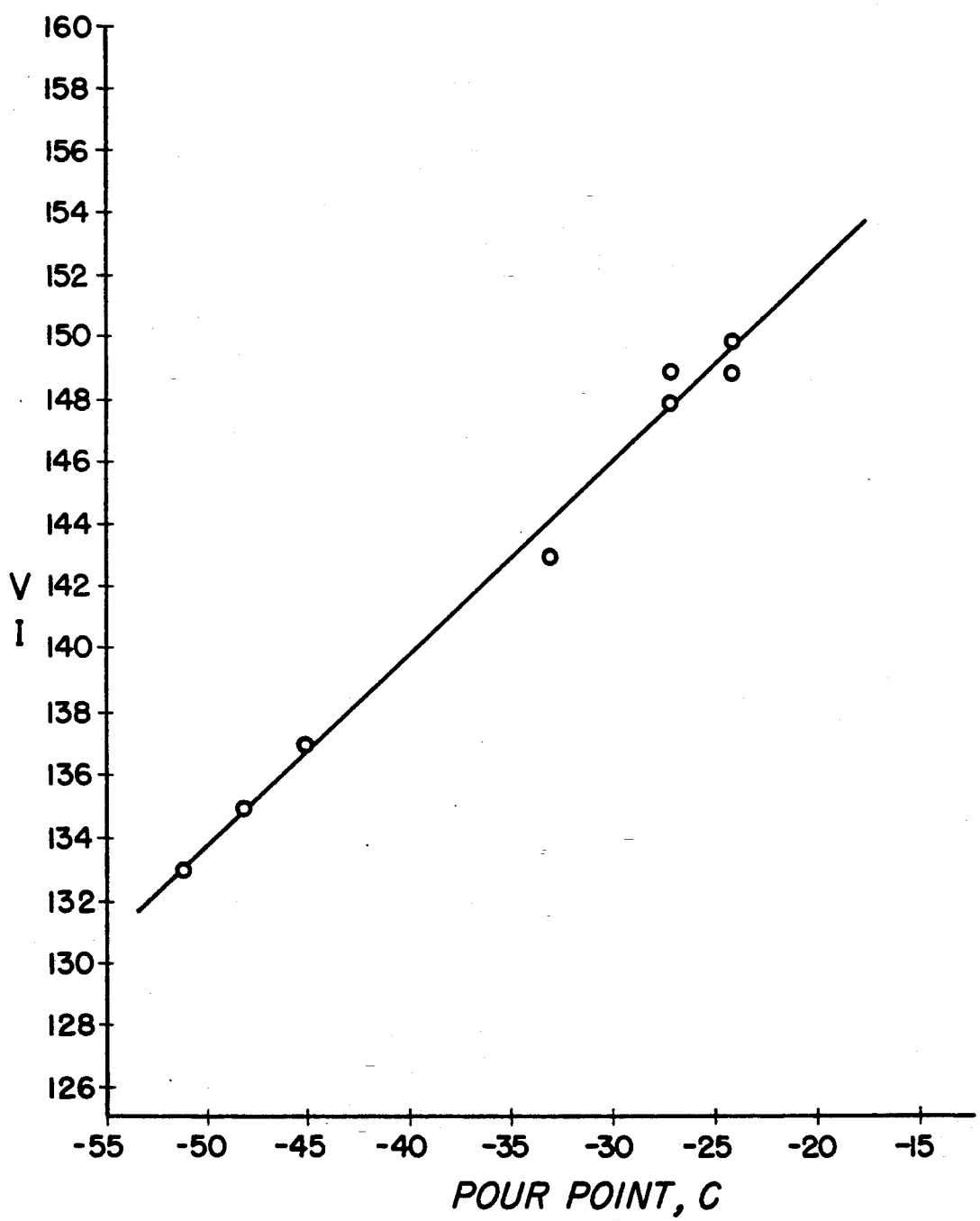

WAX ISOMERIZATION USING CATALYST OF SPECIFIC PORE GEOMETRY

CROSS-REFERENCE

This application is a continuation-in-part of co-pending U.S. patent application Ser. No. 07/311,969, filed Feb. 17, 1989, now abandoned.

FIELD OF THE INVENTION

The present invention relates to a process for isomerizing a waxy feed, including petroleum waxes, over a catalyst having a particular pore geometry and including at least one Group VIII metal to produce a lube oil having a low pour point and excellent viscosity and viscosity index properties.

BACKGROUND OF THE INVENTION

High-quality lubricating oils are critical for the operation of modern machinery and automobiles. Unfortunately, the supply of natural crude oils having good lubricating properties is not adequate for present demands. Due to uncertainties in world crude oil supplies, high-quality lubricating oils must be produced from ordinary crude feedstocks and can even be produced from paraffinic synthetic polymers. Numerous processes have been proposed for producing lubricating oils that can be converted into other products by upgrading the ordinary and low-quality stocks.

It is desirable to upgrade a crude fraction otherwise unsuitable for lubricant manufacture into one from which good yields of lube oils can be obtained. Dewaxing is required when highly paraffinic oils are to be used in products which need to remain mobile at low temperatures, e.g., lubricating oils, heating oils and jet fuels. The higher molecular weight straight chain normal and slightly branched paraffins which are present in oils of this kind are waxes which cause high pour points and high cloud points in the oils. If adequately low pour points are to be obtained, these waxes must be wholly or partly removed. In the past, various solvent removal techniques were used such as propane dewaxing and MEK dewaxing but these techniques are costly and time consuming. Catalytic dewaxing processes are more economical and achieve this end by selectively cracking the longer chain n-paraffins to produce lower molecular weight products, some of which may be removed by distillation.

Because of their selectivity, prior art dewaxing catalysts generally comprise an aluminosilicate zeolite having a pore size which admits the straight chain n-paraffins either alone or with only slightly branched chain paraffins (sometimes referred to herein as waxes), but which excludes more highly branched materials, cycloaliphatics and aromatics. Zeolites such as ZSM-5, ZSM-11, ZSM-12, ZSM-23, ZSM-35 and ZSM-38 have been proposed for this purpose in dewaxing processes and are described in U.S. Pat. Nos. 3,894,938; 4,176,050; 4,181,598; 4,222,855; 4,229,282 and 4,247,388. Such processes as are set forth in the above-mentioned patents are used to accomplish dewaxing on feeds which contain relatively low amounts of waxes, generally well below 50%, and they operate by selectively cracking the waxes. These processes are not readily adapted for treating high wax content feeds since, due to the large amount of cracking which occurs, such waxes would tend to be cracked to provide very low molecular weight products.

Since dewaxing processes of this kind function by means of cracking reactions, a number of useful products become degraded to lower molecular weight materials. For example, waxy paraffins may be cracked to butane, propane, ethane and methane as may the lighter n-paraffins which do not contribute to the waxy nature of the oil. Because these lighter products are generally of lower value than the higher molecular weight materials, it would obviously be desirable to limit the degree of cracking which takes place during a catalytic dewaxing process.

Although U.S. Pat. Nos. 3,700,585; 3,894,938; 4,176,050; 4,181,598; 4,222,855; 4,222,282; 4,247,388 and 4,859,311 teach dewaxing of waxy feeds, the processes disclosed therein do not disclose a process for producing high yields of a lube oil having a very low pour point and high viscosity index from feeds containing a very high wax content, i.e., greater than 80% wax, such as slack wax, deoiled wax or synthetic liquid polymers such as low molecular weight polyethylene.

Also, the prior art does not disclose a lube oil characterized by having both a low pour point (below about $-24°$ C.) and a viscosity index greater than 125. It is believed that the closest that the prior art comes to accomplishing this is set forth in one or more of U.S. Pat. Nos. 3,365,390 (pour point $-23°$ C., viscosity index 124); 3,658,689 (pour point $-54°$ C., viscosity index 92 as calculated from Table III of the patent); 3,764,516 (same as 3,658,689); 3,487,005 (pour point $-29°$ C., viscosity index 121 and 125 and pour point $-46°$ C., viscosity index 122) and 4,547,283 pour point not specified but probably above $0°$ C. as made by solvent dewaxing, viscosity index 154–156).

Since processes which remove wax will give a low Yield with very waxy feeds, isomerization processes are preferred. U.S. Pat. No. 4,734,539 discloses a method for isomerizing a naphtha feed using an intermediate pore size zeolite catalyst, such as an H-offretite catalyst. U.S. Pat. No. 4,518,485 discloses a process for dewaxing a hydrocarbon feedstock containing paraffins by a hydrotreating and isomerization process.

U.S. Patent No. 4,689,138 discloses an isomerization process for reducing the normal paraffin content of a hydrocarbon oil feedstock using a catalyst comprising an intermediate pore size silicoaluminophosphate molecular sieve containing a Group VIII metal component which is occluded in the crystals during growth.

Lube oils may also be prepared from feeds having a high wax content such as slack wax by an isomerization process. In prior art wax isomerization processes, however, either the yield is low and thus the process is uneconomical, or the feed is not completely dewaxed. When the feed is not completely dewaxed it must be recycled to a dewaxing process, e.g., a solvent dewaxer, which limits the throughput and increases cost. U.S. Pat. No. 4,547,283 discloses converting wax to lube. However, the MEK dewaxing following isomerization disclosed therein severely limits pour reduction and thus, very low pour points cannot be achieved. Further, the catalyst disclosed therein is much less selective than the catalysts used in the present invention.

SUMMARY OF THE INVENTION

The present invention overcomes the problems and disadvantages of the prior art by providing a process for preparing a lube oil comprising isomerizing a waxy feed over a catalyst comprising an inorganic oxide molecular sieve having generally oval 1-D pores having a minor axis between about 4.2 Å and about 4.8 Å and a major axis between about 5.4 Å and about 7.0 Å as determined by X-ray crystallography and at least one Group VIII metal.

It is an object of the invention to produce a lube oil having excellent viscosity and viscosity index properties and a very low pour point.

It is a further object of the invention to provide a lube oil having low frictional resistance.

It is an additional object of the invention to provide a lube oil which causes less engine wear than prior art mineral oils.

It is an additional object of the invention to provide a lube oil which provides increased fuel efficiency.

It is yet a further object of the invention to provide a lube oil having improved oxidation resistance compared to conventional mineral oils. The term "oxidation resistance" refers to the resistance of the oil to oxygen addition, i.e., how rapidly oxygen is picked up and added to molecular species within the oil. Oxidation resistance is indicated by the oxidator BN measured in hours. Oxidator BN measures the time required for 100 grams of oil to absorb one liter of oxygen and is described in U.S. Pat. No. 3,852,207 at column 6, lines 15-30 which is incorporated herein by reference.

Additional objects and advantages of the invention will be set forth in part in the description which follows, and in part will be obvious from the description, or may be learned by practice of the invention. The objects and advantages of the invention will be realized and attained by means of the instrumentalities and combinations, particularly pointed out in the appended claims.

In accordance with one embodiment the invention provides a process for producing a lube oil having excellent viscosity and viscosity index properties and a low pour point comprising isomerizing a waxy feed over a catalyst comprising an intermediate pore size silicoaluminophosphate molecular sieve and at least one Group VIII metal.

In accordance with another embodiment of the invention the catalyst in the process comprises an intermediate pore size ZSM-22, ZSM-23 or ZSM-35 zeolite.

The lube oil of the invention has a high paraffinic content which provides a low viscosity for its boiling range. Such properties result in less frictional resistance, less engine wear and increased fuel efficiency. The low viscosity and low pour point of the lube oil result in easier cold engine starting than prior art mineral oils. The lube oil has a high viscosity index ranging from about 125 to about 180 and a very low pour point, ranging from less than about −63° C. to about −24° C. Since little or no viscosity index improver compositions or pour point depressant compositions are necessary for use with the lube oil of the invention, fewer performance-decreasing deposits are formed. The high paraffinic nature of the oil gives it improved oxidation resistance compared to conventional mineral oils.

BRIEF DESCRIPTION OF THE DRAWINGS

The invention will be better understood by reference to figures of the drawings wherein like numbers denote like parts throughout and wherein:

FIG. 3 is a plot of 700° F.+ lube yield versus pour point for the process set forth in Example 3.

FIG. 4 is a plot of viscosity index versus pour point for the process set forth in Example 3.

DETAILED DESCRIPTION OF THE PREFERRED EMBODIMENTS

Figure 1:
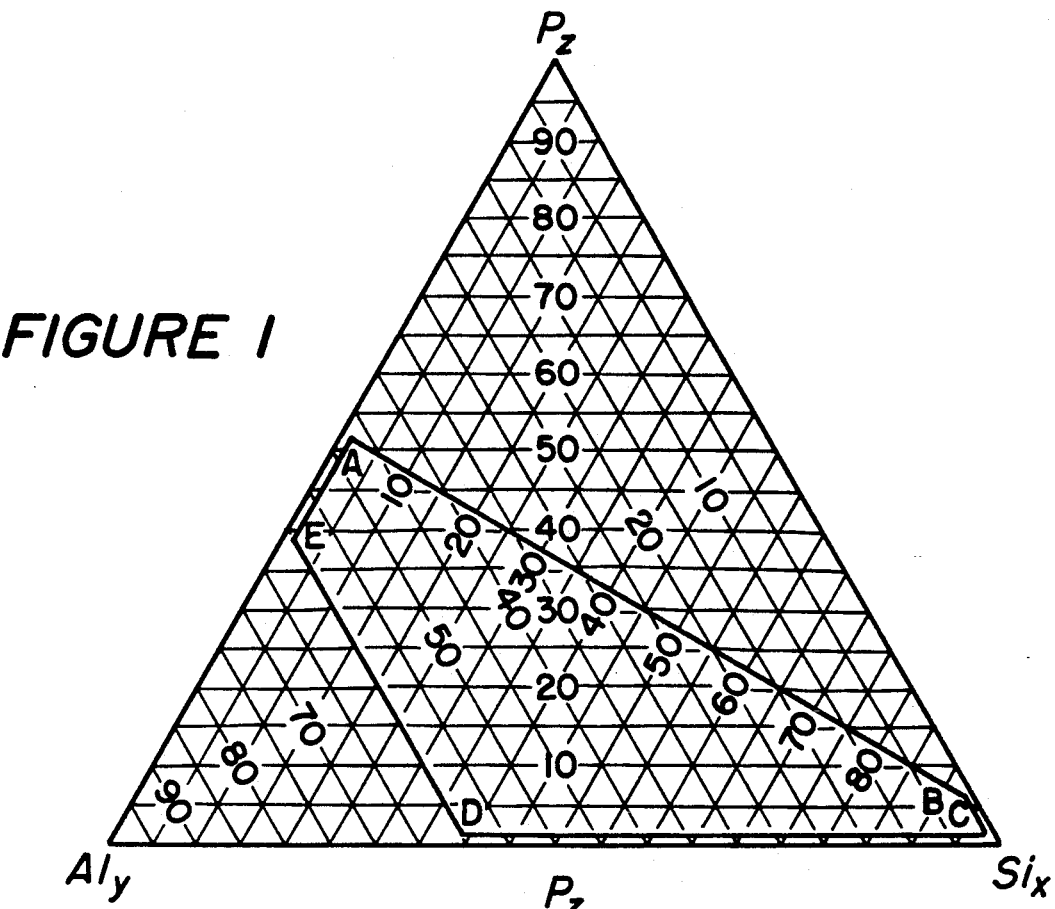
FIG. 1 is a ternary diagram showing the compositional parameters of the silicoaluminophosphates of U.S. Patent No. 4,440,871 in terms of mole fractions of silicon, aluminum and phosphorus.

Reference will now be made in detail to the present preferred embodiments of the invention.

As used herein, the term "waxy feed" includes petroleum waxes. The feedstock employed in the process of the invention preferably contains greater than about 50% wax, more preferably greater than about 80% wax, most preferably greater than about 90% wax. However, a highly paraffinic feed having a high pour point, generally above about 0° C., more usually above about 10° C., but containing less than 50% wax is also suitable for use in the process of the invention. Such a feed should preferably contain greater than about 70% paraffinic carbon, more preferably greater than about 80% paraffinic carbon, most preferably greater than about 90% paraffinic carbon.

Exemplary additional suitable feeds for use in the process of the invention include waxy distillate stocks such as gas oils, lubricating oil stocks, synthetic oils such as those by Fischer-Tropsch synthesis, high pour point polyalphaolefins, foots oils, synthetic waxes such as normal alphaolefin waxes, slack waxes, deoiled waxes and microcrystalline waxes. Foots oil is prepared by separating oil from the wax. The isolated oil is referred to as foots oil.

Feeds also suitable for use in the process of the invention are partially dewaxed oils wherein dewaxing to an intermediate pour point has been carried out by a process other than that claimed herein, for example, conventional catalytic dewaxing processes and solvent dewaxing processes. Exemplary suitable solvent dewaxing processes are set forth in U.S. Pat. No. 4,547,287.

The process of the invention may also be employed in combination with conventional dewaxing processes to achieve a lube oil having particular desired properties. For example, the process of the invention can be used to reduce the pour point of a lube oil to a desired degree. Further reduction of the pour point can then be achieved using a conventional dewaxing process. Under such circumstances, immediately following the isomerization process of the invention, the lube oil may have a pour point greater than about 15° F. Further, the pour point of the lube oil produced by the process of the invention can be reduced by adding pour point depressant compositions thereto.

The feedstock will normally be a $C_{20}+$ feedstock generally boiling above about 600° F. However, the process of the invention is particularly useful with waxy distillate stocks such as gas oils, lubricating oil stocks, heating oils and other distillate fractions whose pour point and viscosity need to be maintained within certain specification limits. Lubricating oil stocks will generally boil above 230° C. (450° F.), more usually above 315° C. (600° F.). Hydroprocessed stocks are a convenient source of stocks of this kind and also of other distillate fractions since they normally contain significant amounts of waxy n-paraffins. The feedstock of the present process will normally be a $C_{20}+$ feedstock containing paraffins, olefins, naphthenes, aromatics and heterocyclic compounds and a substantial proportion of higher molecular weight n-paraffins and slightly branched paraffins which contribute to the waxy nature of the feedstock. During processing, the n-paraffins and the slightly branched paraffins undergo some cracking or hydrocracking to form liquid range materials which contribute to a low viscosity product. The degree of cracking which occurs is, however, limited so that the yield of low boiling products is reduced, thereby preserving the economic value of the feedstock.

Slack wax can be obtained from either a hydrocracked lube oil or a solvent refined lube oil. Hydrocracking is preferred because that process can also reduce the nitrogen content to low values. With slack wax derived from solvent refined oils, deoiling can be used to reduce the nitrogen content. Optionally, hydrotreating of the slack wax can be carried out to lower the nitrogen content thereof. Slack waxes possess a very high viscosity index, normally in the range of from 140 to 200, depending on the oil content and the starting material from which the wax has been prepared. Slack waxes are therefore eminently suitable for the preparation of lubricating oils having very high viscosity indices, i.e., from about 120 to about 180.

The present invention provides a unique lube oil product as characterized by its combination of low pour point and high viscosity index. The lube oil is characterized by a pour point below $-24°$ C. (generally between $-24°$ C. and $-63°$ C.) and a viscosity index between 125 and 180, suitably greater than about 130. Preferably the pour point is below $-30°$ C., more preferably below $-40°$ C., and the viscosity index is greater than about 140.

While the process of the invention can be practiced with utility when the feed contains organic (nitrogen containing impurities), it is preferred that the organic nitrogen content of the feed be less than about 50 ppmw (parts per million by weight), more preferably less than about 10 ppmw. Particularly good results, in terms of activity and length of catalyst cycle (period between successive regenerations or start-up and first regeneration) are experienced when the feed contains less than about 10 ppmw of organic nitrogen.

The phrase "intermediate pore size", as used herein means an effective pore aperture in the range of from about 5.3 to about 6.5 Å when the porous inorganic oxide is in the calcined form. Molecular sieves having pore apertures in this range tend to have unique molecular sieving characteristics. Unlike small pore zeolites such as erionite and chabazite, they will allow hydrocarbons having some branching into the molecular sieve void spaces. Unlike larger pore zeolites such as the faujasites and mordenites, they can differentiate between n-alkanes and slightly branched alkanes, and larger branched alkanes having, for example, quaternary carbon atoms.

The effective pore size of the molecular sieves can be measured using standard adsorption techniques and hydrocarbonaceous compounds of known minimum kinetic diameters. See Breck, *Zeolite Molecular Sieves*, 1974 (especially Chapter 8); Anderson, et al., J. Catalysis 58, 114 (1979); and U.S. Pat. No. 4,440,871, the pertinent portions of which are incorporated herein by reference.

In performing adsorption measurements to determine pore size, standard techniques are used. It is convenient to consider a particular molecule as excluded if it does not reach at least 95% of its equilibrium adsorption value on the molecular sieve in less than about 10 minutes (p/po=0.5; 25° C.).

Intermediate pore size molecular sieves will typically admit molecules having kinetic diameters of 5.3 to 6.5 Å with little hindrance. Examples of such compounds (and their kinetic diameters in Å) are: n-hexane (4.3), 3-methylpentane (5.5), benzene (5.85), and toluene (5.8). Compounds having kinetic diameters of about 6 to 6.5 Å can be admitted into the pores, depending on the particular sieve, but do not penetrate as quickly and in some oases are effectively excluded. Compounds having kinetic diameters in the range of 6 to 6.5 Å include: cyclohexane (6.0), 2,3-dimethylbutane (6.1), and m-xylene (6.1). Generally, compounds having kinetic diameters of greater than about 6.5 Å do not penetrate the pore apertures and thus are not absorbed into the interior of the molecular sieve lattice. Examples of such larger compounds include: o-xylene (6.8), 1,3,5-trimethylbenzene (7.5), and tributylamine (8.1).

The preferred effective pore size range is from about 5.5 to about 6.2 Å.

While the effective pore size as discussed above is important to the practice of the invention not all intermediate pore size molecular sieves having such effective pore sizes are advantageously usable in the practice of the present invention. Indeed, it is essential that the intermediate pore size molecular sieve catalysts used in the practice of the present invention have a very specific pore shape and size as measured by X-ray crystallography. First, the intracrystalline channels must be parallel and must not be interconnected. Such channels are conventionally referred to as 1-D diffusion types or more shortly as 1-D pores. The classification of intrazeolite channels as 1-D, 2-D and 3-D is set forth by R. M. Barrer in Zeolites, Science and Technology, edited by F. R. Rodrigues, L. D. Rollman and C. Naccache, NATO ASI Series, 1984 which classification is incorporated in its entirety by reference (see particularly page 75). Known 1-D zeolites include cancrinite hydrate, laumontite, mazzite, mordenite and zeolite L.

None of the above listed 1-D pore zeolites, however, satisfies the second essential criterion for catalysts useful in the practice of the present invention. This second essential criterion is that the pores must be generally oval in shape, by which is meant the pores must exhibit two unequal axes referred to herein as a minor axis and a major axis. The term oval as used herein is not meant to require a specific oval or elliptical shape but rather to refer to the pores exhibiting two unequal axes. In particular, the 1-D pores of the catalysts useful in the practice of the present invention must have a minor axis between about 4.2 Å and about 4.8 Å and a major axis between about 5.4 Å and about 7.0 Å as determined by conventional X-ray crystallography measurements.

The catalyst used in the isomerization process of the invention has an acidic component and a platinum and/or palladium hydrogenation component. In accordance with one embodiment of the invention the acidic component can suitably comprise an intermediate pore size silicoaluminophosphate molecular sieve which is described in U.S. Pat. No. 4,440,871, the pertinent disclosure of which is incorporated herein by reference.

The most preferred intermediate pore size silicoaluminophosphate molecular sieve for use in the process of the invention is SAPO-11. SAPO-11 comprises a molecular framework of corner-sharing [SiO$_2$] tetrahedra, [AlO$_2$] tetrahedra and [PO$_2$] tetrahedra,

[i.e., $(Si_xAl_yP_z)O_2$ tetrahedral units]. When combined with a platinum or palladium hydrogenation component, the SAPO-11 converts the waxy components to produce a lubricating oil having excellent yield, very low pour point, low viscosity and high viscosity index.

Figure 2:
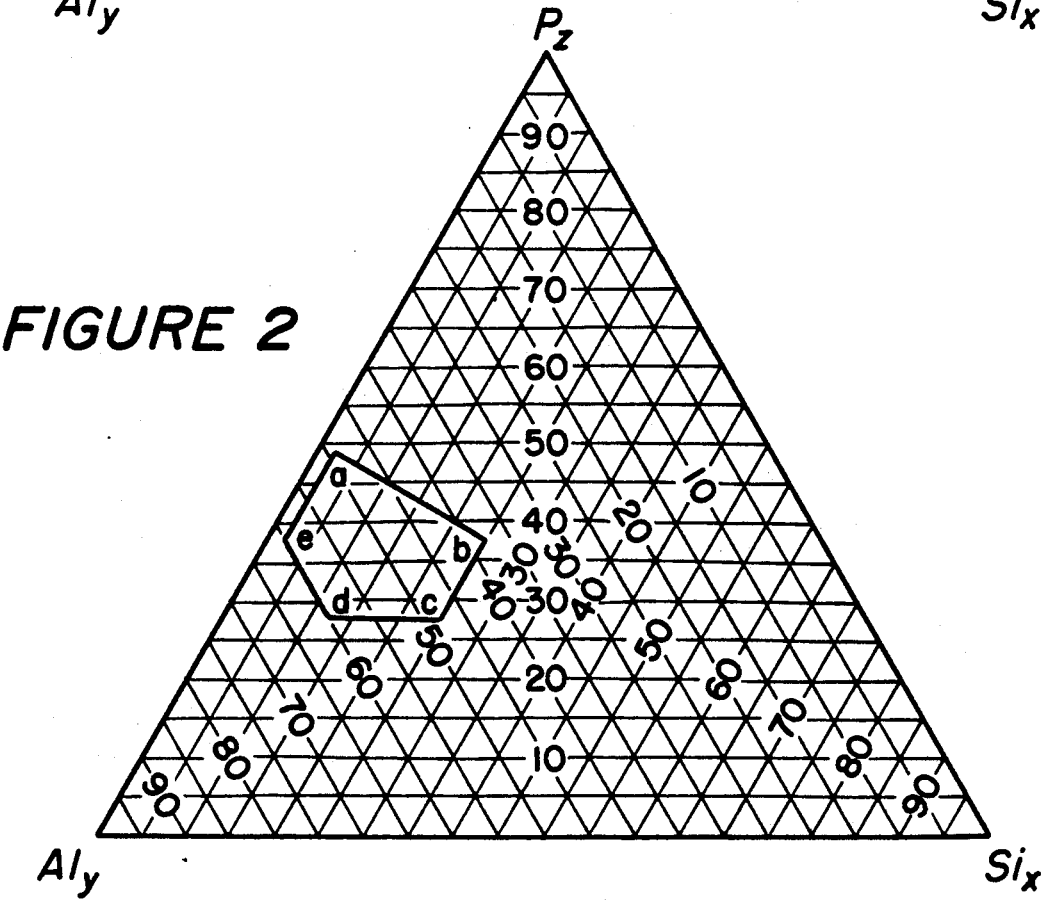
FIG. 2 is a ternary diagram showing the preferred compositional parameters of the silicoaluminophosphates of mole fractions of silicon, aluminum and phosphorus.

SAPO-11 comprises a silicoaluminophosphate material having a three-dimensional microporous crystal framework structure of $[PO_2]$, $[AlO_2]$ and $[SiO_2]$ tetrahedral units whose unit empirical formula on an anhydrous basis is:

$$mR: (Si_xAl_yP_z)O_2 \qquad (I)$$

wherein "R" represents at least one organic templating agent present in the intracrystalline pore system; "m" represents the moles of "R" present per mole of $(Si_xAl_yP_z)O_2$ and has a value of from zero to about 0.3, "x", "y" and "z" represent respectively, the mole fractions of silicon, aluminum and phosphorous, said mole fractions being within the compositional area bounded by points A, B, C., D and E on the ternary diagram of FIG. 1 or preferably within the are bounded by points a, b, c, d and e on the ternary diagram of FIG. 2. The silicoaluminophosphate has a characteristic X-ray powder diffraction pattern which contains at least the d-spacings (as-synthesized and calcined) set forth below in Table I. When SAPO-11 is in the as-synthesized form "m" preferably has a value of from 0.02 to 0.3.

TABLE I

| 2θ | d (Å) | Relative Intensity |
|---|---|---|
| 9.4–9.65 | 9.41–9.17 | m |
| 20.3–20.6 | 4.37–4.31 | m |
| 21.0–21.3 | 4.23–4.17 | vs |
| 22.1–22.35 | 4.02–3.99 | m |
| 22.5–22.9 (doublet) | 3.95–3.92 | m |
| 23.15–23.35 | 3.84–3.81 | m–s |

All of the as-synthesized SAPO-11 compositions for which X-ray powder diffraction data have been obtained to date have patterns which are within the generalized pattern of Table II below.

These values were determined by standard techniques. The radiation was the K-alpha doublet of copper and a diffractometer equipped with a scintillation counter and an associated computer was used. The peak heights, I, and the positions as a function of 2 θ where θ is the Bragg angle, were determined using algorithms on the computer associated with the spectrometer. From these, the relative intensities, $100 \text{ I}/I_o$, where I, is the intensity of the strongest line or peak, and d (obs.) the interplanar spacing in Angstroms, corresponding to the recorded lines, were determined. In the Tables, the relative intensities are given in terms of the symbols vs=very strong, s=strong, m=medium, w=weak, etc.

TABLE II

| 2θ | d (Å) | 100 × I/I$_o$ |
|---|---|---|
| 8.05–8.3 | 10.98–10.65 | 20–42 |
| 9.4–9.65 | 9.41–9.17 | 36–58 |
| 13.1–13.4 | 6.76–6.61 | 12–16 |
| 15.6–15.85 | 5.68–5.59 | 23–38 |
| 16.2–16.4 | 5.47–5.40 | 3–5 |
| 18.95–19.2 | 4.68–4.62 | 5–6 |
| 20.3–20.6 | 4.37–4.31 | 36–49 |
| 21.0–21.3 | 4.23–4.17 | 100 |
| 22.1–22.35 | 4.02–3.99 | 47–59 |
| 22.5–22.9 (doublet) | 3.95–3.92 | 55–60 |
| 23.15–23.35 | 3.84–3.81 | 64–74 |
| 24.5–24.9 (doublet) | 3.63–3.58 | 7–10 |
| 26.4–26.8 (doublet) | 3.38–3.33 | 11–19 |
| 27.2–27.3 | 3.28–3.27 | 0–1 |
| 28.3–28.5 (shoulder) | 3.15–3.13 | 11–17 |
| 28.6–28.85 | 3.121–3.094 | |
| 29.0–29.2 | 3.079–3.058 | 0–3 |
| 29.45–29.65 | 3.033–3.013 | 5–7 |
| 31.45–31.7 | 2.846–2.823 | 7–9 |
| 32.8–33.1 | 2.730–2.706 | 11–14 |
| 34.1–34.4 | 2.629–2.607 | 7–9 |
| 35.7–36.0 | 2.515–2.495 | 0–3 |
| 36.3–36.7 | 2.475–2.449 | 3–4 |
| 37.5–38.0 (doublet) | 2.398–2.368 | 10–13 |
| 39.3–39.55 | 2.292–2.279 | 2–3 |
| 40.3 | 2.238 | 0–2 |
| 42.2–42.4 | 2.141–2.132 | 0–2 |
| 42.8–43.1 | 2.113–2.099 | 3–6 |
| 44.8–45.2 (doublet) | 2.023–2.006 | 3–5 |
| 45.9–46.1 | 1.977–1.969 | 0–2 |
| 46.8–47.1 | 1.941–1.929 | 0–1 |
| 48.7–49.0 | 1.870–1.859 | 2–3 |
| 50.5–50.8 | 1.807–1.797 | 3–4 |
| 54.6–54.8 | 1.681–1.675 | 2–3 |
| 55.4–55.7 | 1.658–1.650 | 0–2 |

Another intermediate pore size silicoaluminophosphate molecular sieve preferably used in the process of the invention is SAPO-31. SAPO-31 comprises a silicoaluminophosphate having a three-dimensional microporous crystal framework of $[PO_2]$, $]AlO_2]$ and $[SiO_2]$ tetrahedral units whose unit empirical formula on an anhydrous basis is:

$$mR: (Si_xAl_yP_z)O_2$$

wherein R represents at least one organic templating agent present in the intracrystalline pore system; "m" represents the moles of "R" present per mole of $(Si_xAl_yP_z)O_2$ and has a value of from zero to 0.3; "x", "y" and "z" represent respectively, the mole fractions of silicon, aluminum and phosphorous, said mole fractions being within the compositional area bounded by points A, B, C, D and E on the ternary diagram of FIG. 1, or preferably within the area bounded by points a, b, c, d and e on the ternary diagram of FIG. 2. The silicoaluminophosphate has a characteristic X-ray powder diffraction pattern (as-synthesized and calcined) which contains at least the d-spacings set forth below in Table III. When SAPO-31 is in the as-synthesized form, "m" preferably has a value of from 0.02 to 0.3.

TABLE III

| 2θ | d (Å) | Relative Intensity |
|---|---|---|
| 8.5–8.6 | 10.40–10.28 | m–s |
| 20.2–20.3 | 4.40–4.37 | m |
| 21.9–22.1 | 4.06–4.02 | w–m |
| 22.6–22.7 | 3.93–3.92 | vs |
| 31.7–31.8 | 3.823–2.814 | w–m |

All of the as-synthesized SAPO-31 compositions for which X-ray powder diffraction data have presently been obtained have patterns which are within the generalized pattern of Table IV below.

TABLE IV

| 2θ | d (Å) | 100 × I/I$_o$ |
|---|---|---|
| 6.1 | 14.5 | 0–1 |
| 8.5–8.6* | 10.40–10.28 | 60–72 |
| 9.5* | 9.31 | 7–14 |
| 13.2–13.3* | 6.71–6.66 | 1–4 |

TABLE IV-continued

| 2θ | d (Å) | 100 × I/I₀ |
|---|---|---|
| 14.7–14.8 | 6.03–5.99 | 1–2 |
| 15.7–15.8* | 5.64–5.61 | 1–8 |
| 17.05–17.1 | 5.20–5.19 | 2–4 |
| 18.3–18.4 | 4.85–4.82 | 2–3 |
| 20.2–20.3 | 4.40–4.37 | 44–55 |
| 21.1–21.2* | 4.21–4.19 | 6–28 |
| 21.9–22.1* | 4.06–4.02 | 32–38 |
| 22.6–22.7* | 3.93–3.92 | 100 |
| 23.3–23.35 | 3.818–3.810 | 2–20 |
| 25.1* | 3.548 | 3–4 |
| 25.65–25.75 | 3.473–3.460 | 2–3 |
| 26.5* | 3.363 | 1–4 |
| 27.9–28.0 | 3.198–3.187 | 8–10 |
| 28.7* | 3.110 | 0–2 |
| 29.7 | 3.008 | 4–5 |
| 31.7–31.8 | 2.823–2.814 | 15–18 |
| 32.9–33.0* | 2.722–2.714 | 0–3 |
| 35.1–35.2 | 2.557–2.550 | 5–8 |
| 36.0–36.1 | 2.495–2.488 | 1–2 |
| 37.2 | 2.417 | 1–2 |
| 37.9–38.1* | 2.374–2.362 | 2–4 |
| 39.3 | 2.292 | 2–3 |
| 43.0–43.1* | 2.103–2.100 | 1 |
| 44.8–45.2* | 2.023–2.006 | 1 |
| 46.6 | 1.949 | 1–2 |
| 47.4–47.5 | 1.918 | 1 |
| 48.6–48.7 | 1.872–1.870 | 2 |
| 50.7–50.8 | 1.801–1.797 | 1 |
| 51.6–51.7 | 1.771–1.768 | 2–3 |
| 55.4–55.5 | 1,658–1.656 | 1 |

*Possibly contains peak from a minor impurity.

SAPO-41, also suitable for use in the process of the invention, comprises a silicoaluminophosphate having a three-dimensional microporous crystal framework structure of [PO₂], [AlO₂] and [SiO₂] tetrahedral units, and whose unit empirical formula on an anhydrous basis is:

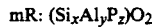

mR: $(Si_xAl_yP_z)O_2$ wherein R represents at least one organic templating agent present in the intracrystalline pore system; "m" represents the moles of "R" present per mole of $(Si_xAl_yP_z)O_2$ and has a value of from zero to 0.3; "x", "y" and "z" represent respectively, the mole fractions of silicon, aluminum and phosphorous, said mole fractions being within the compositional area bounded by points A, B, C., D and E on the ternary diagram of FIG. 1, or preferably within the area bounded by points a, b, c, d and e on the ternary diagram of FIG. 2, and said silicoaluminophosphate having a characteristic X-ray powder diffraction pattern (as-synthesized and calcined) which contains at least the d-spacings set forth below in Table V. When SAPO-41 is in the as-synthesized form "m" preferably has a value of from 0.02 to 0.03.

TABLE V

| 2θ | d (Å) | Relative Intensity |
|---|---|---|
| 13.6–13.8 | 6.51–6.42 | w–m |
| 20.5–20.6 | 4.33–4.31 | w–m |
| 21.1–21.3 | 4.21–4.17 | vs |
| 22.1–22.3 | 4.02–3.99 | m–s |
| 22.8–23.0 | 3.90–3.86 | m |
| 23.1–23.4 | 3.82–3.80 | w–m |
| 25.5–25.9 | 3.493–3.44 | w–m |

All of the as-synthesized SAPO-41 compositions for which X-ray powder diffraction data have presently been obtained have patterns which are within the generalized pattern of Table VI below.

TABLE VI

| 2θ | d (Å) | 100 × I/I₀ |
|---|---|---|
| 6.7–6.8 | 13.19–12.99 | 15–24 |
| 9.6–9.7 | 9.21–9.11 | 12–25 |
| 13.6–13.8 | 6.51–6.42 | 10–28 |
| 18.2–18.3 | 4.87–4.85 | 8–10 |
| 20.5–20.6 | 4.33–4.31 | 10–32 |
| 21.1–21.3 | 4.21–4.17 | 100 |
| 22.1–22.3 | 4.02–3.99 | 45–82 |
| 22.8–23.0 | 3.90–3.87 | 43–58 |
| 23.1–23.4 | 3.82–3.80 | 20–30 |
| 25.2–25.5 | 3.53–3.49 | 8–20 |
| 25.5–25.9 | 3.493–3.44 | 12–28 |
| 29.3–29.5 | 3.048–3.028 | 17–23 |
| 31.4–31.6 | 2.849–2.831 | 5–10 |
| 33.1–33.3 | 2.706–2.690 | 5–7 |
| 37.6–37.9 | 2.392–2.374 | 10–15 |
| 38.1–38.3 | 2.362–2.350 | 7–10 |
| 39.6–39.8 | 2.276–2.265 | 2–5 |
| 42.8–43.0 | 2.113–2.103 | 5–8 |
| 49.0–49.3 | 1.856–1.848 | 1–8 |
| 51.5 | 1.774 | 0–8 |

The process of the invention may also be carried out using a catalyst comprising an intermediate pore size nonzeolitic molecular sieve containing $AlO_2$ and $PO_2$ tetrahedral oxide units, and at least one Group VIII metal. Exemplary suitable intermediate pore size nonzeolitic molecular sieves are set forth in European patent Application No. 158,977 which is incorporated herein by reference.

The group of intermediate pore size zeolites of the present invention include ZSM-22, ZSM-23 and ZSM-35. These catalysts are generally considered to be intermediate pore size catalysts based on the measure of their internal structure as represented by their Constraint Index. Zeolites which provide highly restricted access to and egress from their internal structure have a high value for the Constraint Index, while zeolites which provide relatively free access to the internal zeolite structure have a low value for their Constraint Index. The method for determining Constraint Index is described fully in U.S. Pat. No. 4,016,218 which is incorporated herein by reference.

Those zeolites exhibiting a Constraint Index value within the range of from about 1 to about 12 are considered to be intermediate pore size zeolites. Zeolites which are considered to be in this range include ZSM-5, ZSM-11, etc. Upon careful examination of the intermediate pore size zeolites, however, it has been found that not all of them are efficient as a catalyst for isomerization of a paraffin-containing feedstock which are high in $C_{20}+$ paraffins, and preferably which are high in $C_{22}+$ paraffins. In particular, it has been found that the group including ZSM-22, ZSM-23 and ZSM-35 used in combination with Group VIII metals can provide a means whereby a hydrocarbon feedstock having a paraffinic content with molecules of 20 carbon atoms or more undergoes unexpectedly efficient isomerization without destroying the ultimate yield of the feedstock.

It is known to use prior art techniques for formation of a great variety of synthetic aluminosilicates. These aluminosilicates have come to be designated by letter or other convenient symbols. One of the zeolites of the present invention, ZSM-22, is a highly siliceous material which includes crystalline three-dimensional continuous framework silicon containing structures or crystals which result when all the oxygen atoms in the tetrahedra are mutually shared between tetrahedral atoms of silicon or aluminum, and which can exist with a network of mostly SiO$_2$, i.e., exclusive of any intracrystalline cations. The description of ZSM-22 is set forth in full in U.S. Pat. No. 4,556,477, U.S. Pat. No. 4,481,177 and European Patent Application No. 102,716 the contents of which are incorporated herein by reference.

As indicated in U.S. Pat. No. 4,566,477 the crystalline material ZSM-22 has been designated with a characteristic X-ray diffraction pattern as set forth in Table VII.

TABLE VII

Most Significant Lines of ZSM-22

| Interplanar d-spacings (Å) | Relative Intensity (I/Io) |
|---|---|
| 10.9 ± 0.2 | M-VS |
| 8.7 ± 0.16 | W |
| 6.94 ± 0.10 | W-M |
| 5.40 ± 0.08 | W |
| 4.58 ± 0.07 | W |
| 4.36 ± 0.07 | VS |
| 3.68 ± 0.05 | VS |
| 3.62 ± 0.05 | S-VS |
| 3.47 ± 0.04 | M-S |
| 3.30 ± 0.04 | W |
| 2.74 ± 0.02 | W |
| 2.52 ± 0.02 | W |

It should be understood that the X-ray diffraction pattern of Table VII is characteristic of all the species of ZSM-22 zeolite compositions. Ion exchange of the alkali metal cations with other ions results in a zeolite which reveals substantially the same X-ray diffraction pattern with some minor shifts in interplanar spacing and variation in relative intensity.

Furthermore, the original cations of the as-synthesized ZSM-22 can be replaced at least in part by other ions using conventional ion exchange techniques. It may be necessary to precalcine the ZSM-22 zeolite crystals prior to ion exchange. In accordance with the present invention, the replacement ions are those taken from Group VIII of the Periodic Table, especially platinum, palladium, iridium, osmium, rhodium and ruthenium.

ZSM-22 freely sorbs normal hexane and has a pore dimension greater than about 4 Å. In addition, the structure of the zeolite provides constrained access to larger molecules. The Constraint Index as determined by the procedure set forth in U.S. Pat. No. 4,016,246 for ZSM-22 has been determined to be from about 2.5 to about 3.0.

Another zeolite which can be used with the present invention is the synthetic crystalline aluminosilicate referred to as ZSM-23, disclosed in U.S. Pat. No. 4,076,842, the contents of which are incorporated herein by reference. The ZSM-23 composition has a characteristic X-ray diffraction pattern as set forth herein in Table VIII.

Other molecular sieves which can be used with the present invention include, for example, Theta-1, as described in U.S. Pat. Nos. 4,533,649 and 4,836,910, both of which are incorporated in their entireties by reference, Nu-10, as described in European Patent Application 065,400 which is incorporated in its entirety by reference and SSZ-20 as described in U.S. Pat. No. 4,483,835 which is incorporated in its entirety by reference.

TABLE VIII

| d (Å) | I/I$_o$ |
|---|---|
| 11.2 ± 0.23 | M |
| 10.1 ± 0.20 | W |
| 7.87 ± 0.15 | W |
| 5.59 ± 0.10 | W |
| 5.44 ± 0.10 | W |
| 4.90 ± 0.10 | W |
| 4.53 ± 0.10 | S |
| 3.90 ± 0.08 | VS |
| 3.72 ± 0.08 | VS |
| 3.62 ± 0.07 | VS |
| 3.54 ± 0.07 | M |
| 3.44 ± 0.07 | S |
| 3.36 ± 0.07 | W |
| 3.16 ± 0.07 | W |
| 3.05 ± 0.06 | W |
| 2.99 ± 0.06 | W |
| 2.85 ± 0.06 | W |
| 2.54 ± 0.05 | M |
| 2.47 ± 0.05 | W |
| 2.40 ± 0.05 | W |
| 2.34 ± 0.05 | W |

The ZSM-23 composition can also be defined in terms of mole ratios of oxides in the anhydrous state as follows:

$$(0.58-3.4)M_{2/n}O: Al_2O_3: (40-250)SiO_2$$

wherein M is at least 1 cation and n is the valence thereof. As in the ZSM-22, the original cations of as-synthesized ZSM-23 can be replaced in accordance with techniques well-known in the art, at least in part by ionic exchange with other cations. In the present invention these cations include the Group VIII metals as set forth hereinbefore.

The third intermediate pore size zeolite which has been found to be successful in the present invention is ZSM-35, which is disclosed in U.S. Pat. No. 4,016,245, the contents of which are incorporated herein by reference. The synthetic crystalline aluminosilicate known as ZSM-35, has a characteristic X-ray diffraction pattern which is set forth in U.S. Pat. No. 4,016,245. ZSM-35 has a composition which can be defined in terms of mole ratio of oxides in the anhydrous state as follows:

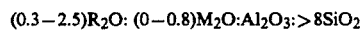

$$(0.3-2.5)R_2O: (0-0.8)M_2O:Al_2O_3: > 8SiO_2$$

wherein R is organic nitrogen-containing cation derived from ethylenediamine or pyrrolidine and M is an alkali metal cation. The original cations of the as-synthesized ZSM-35 can be removed using techniques well known in the art which includes ion exchange with other cations. In the present invention the cation exchange is used to replace the as-synthesized cations with the Group VIII metals set forth herein. It has been observed that the X-ray diffraction pattern os ZSM-35 is similar to that of natural ferrierite with a notable exception being that natural ferrierite patterns exhibit a significant line at 1.33 Å.

X-ray crystallography of SAPO-11, SAPO-31, SAPO-41, ZSM-22, ZSM-23 and ZSM-35 shows these molecular sieves to have the following major and minor axes: SAPO-11, major 6.7 Å, minor 4.4 Å; (Benett, J. M., et al, Zeolites, 1, 160(87)), SAPO-31 and SAPO-41, believed to be slightly larger than SAPO-11, ZSM-22, major 5.5 Å, minor 4.5 Å (Kokotailo, G. T., et al, Zeolites, 5, 349(85)); ZSM-23, major 5.6 Å, minor 4.5 Å; ZSM-35, major 5.4 Å, minor 4.2 Å (Meier, W. M. and Olsen, D. H., Atlas of Zeolite Structure Types, Butterworths, 1987).

The intermediate pore size molecular sieve is used in admixture with at least one Group VIII metal. Preferably the Group VIII metal is selected from the group consisting of at least one of platinum and palladium and optionally, other catalytically active metals such as molybdenum, nickel, vanadium, cobalt, tungsten, zinc and mixtures thereof. Most preferably, the Group VIII metal is selected from the group consisting of at least one of platinum and palladium. The amount of metal ranges from about 0.01% to about 10% by weight of the molecular sieve, preferably from about 0.2% to about 5% by weight of the molecular sieve. The techniques of introducing catalytically active metals into a molecular sieve are disclosed in the literature, and preexisting metal incorporation techniques and treatment of the molecular sieve to form an active catalyst such as ion exchange, impregnation or occlusion during sieve preparation are suitable for use in the present process. Such techniques are disclosed in U.S. Pat. Nos. 3,236,761; 3,226,339; 3,236,762; 3,620,960; 3,373,109; 4,202,996; 4,440,781 and 4,710,485 which are incorporated herein by reference.

The term "metal" or "active metal" as used herein means one or more metals in the elemental state or in some form such as sulfide, oxide and mixtures thereof. Regardless of the state in which the metallic component actually exists, the concentrations are computed as if they existed in the elemental state.

The catalyst may also contain metals which reduce the number of strong acid sites on the catalyst and thereby lower the selectivity for cracking versus isomerization. Especially preferred are the Group IIA metals such as magnesium and calcium.

It is preferred that relatively small crystal size catalyst be utilized in practicing the invention. Suitably, the average crystal size is no greater than about $10\mu$, preferably no more than about $5\mu$, more preferably no more than about $1\mu$ and still more preferably no more than about $0.5\mu$.

Strong acidity may also be reduced by introducing nitrogen compounds, e.g., $NH_3$ or organic nitrogen compounds, into the feed; however, the total nitrogen content should be less than 50 ppm, preferably less than 10 ppm. The physical form of the catalyst depends on the type of catalytic reactor being employed and may be in the form of a granule or powder, and is desirably compacted into a more readily usable form (e.g., larger agglomerates), usually with a silica or alumina binder for fluidized bed reaction, or pills, prills, spheres, extrudates, or other shapes of controlled size to accord adequate catalyst-reactant contact. The catalyst may be employed either as a fluidized catalyst, or in a fixed or moving bed, and in one or more reaction stages.

The catalytic isomerization step of the invention may be conducted by contacting the feed with a fixed stationary bed of catalyst, with a fixed fluidized bed, or with a transport bed. A simple and therefore preferred configuration is a trickle-bed operation in which the feed is allowed to trickle through a stationary fixed bed, preferably in the presence of hydrogen.

The catalytic isomerization conditions employed depend on the feed used and the desired pour point. Generally, the temperature is from about 200° C. to about 475° C., preferably from about 250° C. and to about 450° C. The pressure is typically from about 15 psig and to about 2000 psig, preferably from about 50 to about 1000 psig, more preferably from about 100 psig to about 600 psig. The process of the invention is preferably carried out at low pressure. The liquid hourly space velocity (LHSV) is preferably from about 0.1 to about 20, more preferably from about 0.1 to about 5, and most preferably from about 0.1 to about 1.0. Low pressure and low liquid hourly space velocity provide enhanced isomerization selectivity which results in more isomerization and less cracking of the feed thus producing an increased yield.

Hydrogen is preferably present in the reaction zone during the catalytic isomerization process. The hydrogen to feed ratio is typically from about 500 to about 30,000 SCF/bbl (standard cubic feet per barrel), preferably from about 1,000 to about 10,000 SCF/bbl. Generally, hydrogen will be separated from the product and recycled to the reaction zone.

The intermediate pore size molecular sieve used in the isomerization step provides selective conversion of the waxy components to non-waxy components. During processing, isomerization of the paraffins occurs to reduce the pour point of the oil below that of the feed and form lube oil boiling range materials which contribute to a low pour point product having excellent viscosity index properties.

Because of the selectivity of the intermediate pore size molecular sieve used in the invention, the yield of low boiling products is reduced, thereby preserving the economic value of the feedstock.

The intermediate pore size molecular sieve catalyst can be manufactured into a wide variety of physical forms. The molecular sieves can be in the form of a powder, a granule, or a molded product, such as an extrudate having a particle size sufficient to pass through a 2-mesh (Tyler) screen and be retained on a 40-mesh (Tyler) screen. In cases wherein the catalyst is molded, such as by extrusion with a binder, the silicoaluminophosphate can be extruded before drying, or, dried or partially dried and then extruded.

The molecular sieve can be composited with other materials resistant to temperatures and other conditions employed in the isomerization process. Such matrix materials include active and inactive materials and synthetic or naturally occurring zeolites as well as inorganic materials such as clays, silica and metal oxides. The latter may be either naturally occurring or in the form of gelatinous precipitates, sols or gels including mixtures of silica and metal oxides. Inactive materials suitably serve as diluents to control the amount of conversion in the isomerization process so that products can be obtained economically without employing other means for controlling the rate of reaction. The molecular sieve may be incorporated into naturally occurring clays, e.g., bentonite and kaolin. These materials, i.e., clays, oxides, etc., function, in part, as binders for the catalyst. It is desirable to provide a catalyst having good crush strength because in petroleum refining, the catalyst is often subjected to rough handling. This tends to break the catalyst down into powderlike materials which cause problems in processing.

Naturally occurring clays which can be composited with the molecular sieve include the montmorillonite and kaolin families, which families include the sub-bentonites, and the kaolins commonly known as Dixie, McNamee, Georgia and Florida clays or others in which the main mineral constituent is halloysite, kaolinite, diokite, nacrite or anauxite. Fibrous clays such as halloysite, sepiolite and attapulgite can also be use as supports. Such clays can be used in the raw state as originally mined or initially subjected to calcination, acid treatment or chemical modification.

In addition to the foregoing materials, the molecular sieve can be composited with porous matrix materials and mixtures of matrix materials such as silica, alumina, titania, magnesia, silica-alumina, silica-magnesia, silica-zirconia, silica-thoria, silica-beryllia, silica-titania, titania-zirconia as well as ternary compositions such as silica-alumina-thoria, silica-aluminatitania, silica-alumina-magnesia and silica-magnesia-zirconia. The matrix can be in the form of a cogel.

The catalyst used in the process of this invention can also be composited with other zeolites such as synthetic and natural faujasites, (e.g., X and Y) erionites, and mordenites. It can also be composited with purely synthetic zeolites such as those of the ZSM series. The combination of zeolites can also be composited in a porous inorganic matrix.

It is often desirable to use mild hydrogenation referred to as hydrofinishing after isomerization to produce more stable lubricating oils. Hydrofinishing is typically conducted at temperatures ranging from about 190° C. to about 340° C., at pressures from about 400 psig to about 3000 psig, at space velocities (LHSV) from about 0.1 to about 20, and hydrogen recycle rates of from about 400 to about 1500 SCF/bbl. The hydrogenation catalyst employed must be active enough not only to hydrogenate the olefins, diolefins and color bodies within the lube oil fractions, but also to reduce the aromatic content. The hydrofinishing step is beneficial in preparing an acceptably stable lubricating oil.

Suitable hydrogenation catalysts include conventional metallic hydrogenation catalysts, particularly the Group VIII metals such as cobalt, nickel, palladium and platinum. The metals are typically associated with carriers such as bauxite, alumina, silica gel, silica-alumina composites, and crystalline aluminosilicate zeolites. Palladium is a particularly preferred hydrogenation metal. If desired, non-noble Group VIII metals can be used with molybdates. Metal oxides or sulfides can be used. Suitable catalysts are disclosed in U.S. Pat. Nos. 3,852,207; 4,157,294; 3,904,513 and 4,673,487, which are incorporated herein by reference.

The high viscosity index lube oil produced by the process of the present invention can be used as a blending component to raise the viscosity index of lube oils to a higher value. Since yield decreases with increasing viscosity index in either hydrocracking or solvent refining, the use of an isomerized wax to increase the viscosity index improves yield.

The invention will be further clarified by the following examples, which are intended to be purely exemplary of the invention.

The wax content of the oil set forth in the following Examples was determined as follows:

300 g of oil was diluted 50/50 with a 4:1 mixture of methyl ethyl ketone and toluene which was cooled to −20° C. in a refrigerator. The mixture was filtered through a Coors funnel at −15° C. using Whatman No. 3 filter paper. The wax was removed from the filter and placed in a tared 2 liter flask. The solvent was removed on a hot plate and the wax weighed.

EXAMPLE 1

SAPO-11 was prepared as follows:

472.4 g of 85% $H_3PO_4$ were added to 1208 g of distilled $H_2O$ in a Teflon beaker in an ice bath. 816.8 g of aluminum isopropoxide ($Al[OC_3H_7]_3$) were slowly added with mixing and then mixed until homogenous. Then 120 g of fumed silica (Cabosil M-5) were added with mixing. Next, 182.4 g of di-n-propylamine ($Pr_2NH$) were added, followed by 9.0 g of 85% $H_3PO_4$. Final mixing was done using a Polytron. The mixture had a pH of 6.5 and the following composition, expressed in molar ratio of oxides:

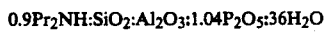

$0.9Pr_2NH:SiO_2:Al_2O_3:1.04P_2O_5:36H_2O$

The mixture was placed in a Teflon bottle in a stainless steel pressure vessel and heated for 5 days at 200° C. with no stirring and autogenous pressure. The supernatant liquid was removed and the product was filtered, washed with water, dried overnight at 121° C., and calcined in air for 8 hours at 566° C. The average crystallite size was less than 0.5 micron. The product was identified as SAPO-11 by X-ray diffraction analysis. Elemental analysis of the calcined sieve showed it to have the following anhydrous molar composition:

$0.37SiO_2:Al_2O_3:P_2O_5$

The sieve was bound with 35% Catapal alumina and made into 1/10 inch extrudate. The extrudate was dried 3 hours at 121° C., calcined in air for 4 hours at 454° C., then impregnated with 0.5% Pt (as $Pt(NH_3)_4Cl_2.H_2O$) by the pore-fill method. It was then dried for 2 hours at 93° C., 2 hours at 149° C., and calcined in air for 8 hours at 454° C. For the following examples, the catalyst was crushed and screened to 24–42 mesh.

EXAMPLE 2

The catalyst of Example 1 was used to isomerize a 800° F.+ hydrocracked waxy vacuum gas oil (Table IX) at 2200 psig, 1 LHSV, and 8 M SCF/bbl once-through $H_2$. The catalyst was also run at 400 pisg. The results are set forth in Table X and demonstrate that high lube yield at very low pour point is achieved by the present process. The data also evidences the substantial yield benefit from operating at a lower reactor pressure. Lube yield is

TABLE IX

| 800° F.+ Hydrocracked Waxy VGO | |
|---|---|
| Gravity, °API | 40.0 |
| Wax, Wt. % | 25.0 |
| Pour Point, °C. | +39 |
| Viscosity at 100° C., cSt | 4.585 |
| VI | 152 |
| Simulated Distillation, LV %, °F. | |
| ST/5 | 749/769 |
| 10/30 | 778/803 |
| 50 | 826 |
| 70/90 | 857/920 |
| 95/99 | 956/1016 |
| Hydrocarbon Distribution, LV % | |
| Paraffins | 54 |
| Naphthenes | 29 |
| Aromatics | 17 |
| Carbon Type Distribution, ndM, (D3238-85), wt % | |
| Paraffinic | 92 |
| Naphthenic | 8 |
| Aromatic | 0 |

TABLE X

Isomerizing 800° F.+ Hydrocracked Waxy VGO
at 1 LHSV and 8 M SCF/bbl H₂ (Pt/SAPO-11)

| Pressure, psig | Catalyst Temperature, °F. | Yield, Wt. % | Pour/Cloud, °C. | Viscosity at 40/100° C., cSt | VI |
|---|---|---|---|---|---|
| 2200 | 670 | 74.5 | −12/−6 | 18.87/4.305 | 139 |
|  | 690 | 63.3 | −24/−19 | 19.08/4.301 | 136 |
|  | 710 | 44.9 | −48/−47 | 19.56/4.294 | 129 |
| 400 | 650 | 69.7 | −45/−28 | 19.43/4.349 | 136 |
|  | 670 | 55.0 | <−63/<−63 | 19.64/4.304 | 128 | defined as $$\frac{g(\text{product})}{g(\text{feed})} \times 100\%$$

where the product has the same 5 LV% boiling point as the feed.

EXAMPLE 3

The catalyst of Example 1 was used to isomerize a slack wax derived from a 900° F.+ hydrocracked vacuum gas oil (Table XI). Conditions were 160 psig reactor pressure, 0.3 LHSV, and 8 M SCF/bbl once-through H₂. At a catalyst temperature of 680° F., a −27° C. pour point oil of 7.1 cSt viscosity at 100° C. and 149 viscosity index was produced. Pour point reduction could be increased by raising the catalyst temperature. FIG. 3 shows a plot of 700° F.+ lube yield versus pour point, where 700° F.+ lube yield is defined as:

$$\left\{1 - \frac{g700° \text{F.+ (feed)} - g700° \text{F.+ (product)}}{g700° \text{F.+ (feed)}}\right\} \times 100\%$$

FIG. 4 shows a plot of viscosity index versus pour point.

A −30° C. pour point oil prepared in this example was subsequently hydrofinished over a 0.5% Pd on silica-alumina catalyst at 500° F., 2200 psig,

TABLE XI

Slack Wax From 900° F.+ Hydrocracked VGO

| Gravity, °API | 23.2 |
|---|---|
| Sulfur, ppm | 2.2 |
| Nitrogen, ppm | <1 |
| Pour Point, °C. | +63 |
| Viscosity, cSt, |  |
| 100° C. | 8.30 |
| 70° C. | 16.55 |
| Oil in Wax, Wt % | 14.5 |
| Simulated Distillation, LV %, °F. |  |
| ST/5 | 802/860 |
| 10/30 | 885/933 |
| 50 | 960 |
| 70/90 | 995/1038 |
| 95/99 | 1063/1118 |

0.25 LHSV, and 8 M SCF/bbl H₂. Inspections of the hydrofinished oil are given in Table XVI.

EXAMPLE 4

The catalyst of Example 1 was used to isomerize a deoiled slack wax derived from a 700°-800° F. solvent refined vacuum gas oil (Table XII). Conditions were 160 psig, 0.3 LHSV, and 8 M SCF/bbl once-through H₂. The results are set forth in Table XIII.

EXAMPLE 5

The catalyst of Example 1 was used to isomerize a deoiled slack wax derived from a 800°-900° F. solvent refined vacuum gas oil (Table XIV). Conditions were the same as in Example 4. The results are set forth in Table XV.

TABLE XII

Deoiled Slack Wax from
700-800° F. Solvent Refined VGO

| Gravity, °API | 41.0 |
|---|---|
| Pour Point, °C. | +51 |
| Viscosity, cSt, 100° C. | 3.141 |
| Sulfur, ppm | 383 |
| Nitrogen, ppm | 8.9 |
| N-paraffins, Wt. % | 77.2 |
| Simulated Distillation, LV %, °F. |  |
| ST/5 | 617/674 |
| 10/30 | 695/732 |
| 50 | 760 |
| 70/90 | 795/842 |
| 95/99 | 861/903 |

TABLE XIII

Isomerizing Deoiled Slack Wax from 700-800° F.
Solvent Refined Oil at 160 psig,
0.3 LHSV and 8 M SCF/bbl H₂ over Pt/SAPO-11

| Catalyst Temperature, °F. | 650° F.+ Yield, Wt. % | Pour/Cloud, °C. | Viscosity at 40/100° C., cSt | VI |
|---|---|---|---|---|
| 640 | 72.0 | −18/−5 | 9.563/2.817 | 151 |
| 650 | 77.1 | −15/−2 | 9.883/2.889 | 154 |
| 655 | 81.1 | −15/0 | 10.10/2.918 | 150 |

TABLE XIV

Deoiled Slack Wax from
800-900° F. Solvent Refined VGO

| Gravity, °API | 40.2 |
|---|---|
| Pour Point, °C. | +57 |
| Viscosity, cSt, |  |
| 100° C. | 4.317 |
| 70° C. | 7.554 |
| Sulfur, ppm | 122 |
| Nitrogen, ppm | 3.4 |
| N-paraffins, Wt. % | 57.1 |
| Simulated Distillation, LV %, °F. |  |
| ST/5 | 565/714 |
| 10/30 | 738/808 |
| 50 | 843 |
| 70/90 | 873/909 |
| 95/99 | 928/965 |

TABLE XV

Isomerizing Deoiled Slack Wax from 800-900° F.
Solvent Refined Oil at 160 psig,
0.3 LHSV and 8 M SCF/bbl H₂ over Pt/SAPO-11

| Catalyst Temperature, °F. | 700° F.+ Yield, Wt. % | Pour/Cloud, °C. | Viscosity at 40/100° C., cSt | VI |
|---|---|---|---|---|
| 655 | 90.4 | +6/+17 | 15.44/4.017 | 169 |

TABLE XV-continued

Isomerizing Deoiled Slack Wax from 800-900° F.
Solvent Refined Oil at 160 psig,
0.3 LHSV and 8 M SCF/bbl H$_2$ over Pt/SAPO-11

| Catalyst Temperature, °F. | 700° F.+ Yield, Wt. % | Pour/Cloud, °C. | Viscosity at 40/100° C., cSt | VI |
|---|---|---|---|---|
| 670 | 85.3 | −9/+3 | 15.58/3.938 | 155 |
| 685 | 79.5 | −24/−6 | 16.16/3.997 | 152 |
| 700 | 77.4 | −27/−9 | 16.73/4.050 | 147 |

EXAMPLE 6

ZSM-22 was prepared as follows:
The following reactants were combined to produce a gel: N,N'-dimethyl imidazolium hydroxide, Ludox AS-30 silica sol, aluminum sulfate, sodium hydroxide, and water in the ratios:

$SiO_2/Al_2O_3 = 100$
$H_2O/SiO_2 = 30$
template/$SiO_2 = 0.15$
$NaOH/SiO_2 = 0.10$
$OH^{31}/SiO_2 = 0.25$ The reaction was run at autogenous pressure in a stainless steel autoclave at 150° C. for 6 days. The product was filtered, calcinated to 1000° F. in air, ion-exchanged four times with excess NH$_4$NO$_3$ and calcined again to 1000° F. The product was identified by X-ray diffraction analysis as ZSM-22. The SiO$_2$/Al$_2$O$_3$ mole ratio was about 100. The sieve was bound with 35% Catapal and the extrudate impregnated

TABLE XVI

Hydrofinished Oil from Example 3

| | |
|---|---|
| Color | <1.0 |
| Gravity, °API | 37.0 |
| Aniline Pt, °F. | 259.6 |
| Pour Point, °C. | −30 |
| Cloud Point, °C. | −7 |
| Sulfur, ppm | 0.4 |
| Nitrogen, ppm | <1 |
| Viscosity, cSt | |
| 40° C. | 39.33 |
| 100° C. | 7.073 |
| VI | 143 |
| Oxidator BN, hr | 40.9 |
| Carbon Type Distribution, ndM, Wt. % | |
| Paraffinic | 80.27 |
| Naphthenic | 19.73 |
| Aromatic | 0.00 |
| Simulated Distillation, LV %, °F. | |
| ST/5 | 630/702 |
| 10/30 | 749/862 |
| 50 | 916 |
| 70/90 | 957/1005 |
| 95/99 | 1030/1084 | with 1% Pt and calcined in the same manner as the catalyst of Example 1.

EXAMPLE 7

The catalyst of Example 6 was used to isomerize the slack wax of Table XI at 500 psig, 0.3 LHSV, and 8 M SCF/bbl once-through H$_2$. The results are set forth in Table XVII.

EXAMPLE 8

The catalyst of Example 6 was mixed with a 10-fold excess of 5 wt. % Mg CO$_3$ in water, filtered, dried for 18 hours at 93° C., and calcined for 12 hours at 538° C. The Mg content was 22.7 wt. %. This catalyst was used to isomerize the slack wax of Table XI at 0.3 LHSV and 8 MSCF/bbl H$_2$, both at 500 psig and 160 psig. The results are set forth in Table XVIII, showing a higher yield for this catalyst than

TABLE XVII

Isomerizing Slack Wax from 900° F.+ Hydrocracked VGO
at 500 psig, 0.3 LHSV and 8 M SCF/bbl H$_2$ over Pt/ZSM-22

| Catalyst Temperature, °F. | 700° F.+ Yield, Wt. % | Pour/Cloud, °C. | Viscosity at 40/100° C., cSt | VI |
|---|---|---|---|---|
| 600 | 53.4 | −3/+9 | 59.64/9.363 | 138 |
| 620 | 51.3 | −18/<−63 | 61.50/9.442 | 134 |
| 640 | 52.4 | −30/<−63 | 57.97/8.971 | 133 |

TABLE XVIII

Isomerizing Slack Wax from 900° F.+ Hydrocracked
VGO at 0.3 LHSV and 8 M SCF/bbl H$_2$ over Pt—Mg/ZSM-22

| Pressure psig | Catalyst Temperature, °F. | 700° F.+ Yield, Wt. % | Pour/Cloud, °C. | Viscosity at 40/100° C., cSt | VI |
|---|---|---|---|---|---|
| 500 | 645 | 63.3 | −18/+2 | 55.09/8.990 | 143 |
|  | 660 | 61.8 | −24/<−63 | 54.08/8.835 | 142 |
| 160 | 640 | 76.1 | −27/−4 | 45.55/8.003 | 149 |
|  | 660 | 69.5 | −39/−8 | 46.10/7.886 | 142 | that of Example 6 without Mg. The beneficial effect of low pressure on yield is also shown.

EXAMPLE 9

The catalyst of Example 6 was used to isomerize a deoiled slack wax derived from a 900° F.+ solvent refined vacuum gas oil (Table XIX). Conditions were the same as Example 7. The results are set forth in Table XX.

EXAMPLE 10

The catalyst of Example 8 was used to isomerize a slack wax (not deoiled) derived from a 700°–800° F. solvent refined vacuum gas oil (the same used to prepare the feed of Table XII). Inspections of the feed are given in Table XXI. Isomerization conditions were the same as in Example 7. The results are set forth in Table XXII.

EXAMPLE 11

ZSM-23 was prepared as in U.S. Pat. No. 4,076,842, and identified as such by X-ray diffraction analysis after calcination at 1000° F. in air. It was exchanged four times with excess NH$_4$NO$_3$ and calcined again at 1000° F. The sieve was impregnated with 0.5% Pt and calcined in the same manner as the catalyst of Example 1.

TABLE XIX

Deoiled Slack Wax from 900° F.+ Solvent Refined VGO

| | |
|---|---|
| Gravity, °API | 36.7 |

TABLE XIX-continued

Deoiled Slack Wax from 900° F.+ Solvent Refined VGO

| | |
|---|---|
| N, ppm | 12 |
| S, ppm | 326 |
| Viscosity, cSt, | |
| 100° C. | 7.307 |
| 70° C. | 14.03 |
| Simulated Distillation, LV %, °F. | |
| ST/5 | 47/678 |
| 10/30 | 808/899 |
| 50 | 931 |
| 70/90 | 965/1011 |
| 95/99 | 1035/1090 |

TABLE XX

Isomerizing Deoiled Slack Wax from 900° F.+ Solvent Refined Oil at 0.3 LHSV, 500 psig, and 8 M SCF/bbl $H_2$ over Pt/ZSM-22

| Catalyst Temperature, °F. | 700° F.+ Yield, Wt. % | Pour/Cloud, °C. | Viscosity at 40/100° C., cSt | VI |
|---|---|---|---|---|
| 665 | 54.9 | −10/−6 | 44.67/7.928 | 150 |
| 680 | 54.9 | −24/<−63 | 48.11/8.170 | 143 |
| 700 | 51.0 | −33/−4 | 41.30/7.442 | 148 |

TABLE XXI

Slack Wax From 700–800° F.+ Solvent Refined VGO

| | |
|---|---|
| Gravity, °API | 40.0 |
| N, ppm | 20 |
| S, ppm | 300 |
| Viscosity, | |
| 100° C., cSt | 3.246 |
| 70° C. | 5.482 |
| Pour Point, °C. | +42 |
| Simulated Distillation, LV %, °F. | |
| ST/5 | 575/670 |
| 10/30 | 685/723 |
| 50 | 759 |
| 70/90 | 794/842 |
| 95/99 | 861/902 |

TABLE XXII

Isomerizing Slack Wax from 700–800° F. Solvent Refined VGO at 0.3 LHSV, 500 psig, and 8 M SCF/bbl $H_2$ over Pt—Mg/ZSM-22

| Catalyst Temperature, °F. | 700° F.+ Yield, Wt. % | Pour/Cloud, °C. | Viscosity at 40/100° C., cSt | VI |
|---|---|---|---|---|
| 640 | 49.1 | −9/−6 | 14.55/3.893 | 174 |
| 700 | 45.1 | −24/<−63 | 14.66/3.594 | 130 |
| 720 | 42.8 | −33/<−63 | 14.78/3.893 | 169 |

EXAMPLE 12

The catalyst of Example 11 was used to isomerize the feed of Table XI at 0.3 LHSV, 500 psig, and 8 MSCF/bbl $H_2$. The results are set forth in Table XXIII.

EXAMPLE 13

The catalyst of Example 8 was used to isomerize a $C_{30}+$ normal alphaolefin wax (Table XXIV) at 0.3 LHSV and 8 MSCF/bbl $H_2$, both at 500 psig and 300 psig. The results are set forth in Table XXV.

TABLE XXIII

Isomerizing Slack Wax from 900° F.+ Hydrocracked VGO at 500 psig, 0.3 LHSV, and 8 M SCF/bbl $H_2$ over Pt/ZSM-23

| Catalyst Temperature, °F. | 700° F.+ Yield, Wt. % | Pour/Cloud, °C. | Viscosity at 40/100° C., cSt | VI |
|---|---|---|---|---|
| 610 | 50.3 | +9/+10 | 48.87/7.887 | 130 |
| 630 | 43.3 | −27/−14 | 47.53/7.445 | 120 |

TABLE XXIV $C_{30}+$ Normal Alphaolefin Wax

| | |
|---|---|
| Pour Point, °C. | +72 |
| Viscosity, 100° C., cSt | 7.478 |
| Simulated Distillation, LV %, °F. | |
| ST/5 | 802/807 |
| 10/30 | 809/844 |
| 50 | 893 |
| 70/90 | 931/1026 |
| 95/99 | 1087/1139 |

TABLE XXV

Isomerizing $C_{30}+$ Normal Alphaolefin Wax at 0.3 LHSV, and 8 M SCF/bbl $H_2$ over Pt—Mg/ZSM-22

| Pressure psig | Catalyst Temperature, °F. | 700° F.+ Yield, Wt. % | Pour/Cloud, °C. | Viscosity at 40/100° C., cSt | VI |
|---|---|---|---|---|---|
| 500 | 685 | 44.4 | −48/−10 | 51/88/9.383 | 166 |
| | 700 | 41.9 | −57/−26 | 54.42/9.467 | 158 |
| 300 | 640 | 52.8 | −36/−4 | 47.60/8.998 | 173 |
| | 660 | 47.9 | −51/<−63 | 50.87/9.192 | 165 |
| | 685 | 46.5 | <−63/<−63 | 51.67/9.063 | 157 |

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A process for producing lube oil comprising isomerizing a waxy feed having greater than about 50% wax over a catalyst comprising a molecular sieve having generally oval 1-D pores having a minor axis between about 4.2 Å and about 4.8 Å and a major axis between about 5.4 Å and about 7.0 Å and at least one Group VIII metal at a pressure of from about 15 psig to about 2000 psig.

2. The process of claim 1, wherein said waxy feed contains at least about 80% wax.

3. The process of claim 1, wherein said waxy feed contains at least about 90% wax.

4. A process as set forth in claim 1, wherein the waxy feed contains at least about 70% paraffinic carbon.

5. The process of claim 4, wherein said waxy feed contains at least about 80% paraffinic carbon.

6. The process of claim 4, wherein said waxy feed contains at least about 90% paraffinic carbon.

7. The process of claim 1, wherein said waxy feed is selected from the group consisting of gas oil, lubricating oil stock, synthetic oil, foots oil, slack wax, deoiled wax, normal alphaolefin wax and microcrystalline wax.

8. The process of claim 1, wherein said molecular sieve is selected from the group consisting of SAPO-11, SAPO-31, SAPO-41, ZSM-22, ZSM-23, and ZSM-35 and said metal compound is selected from the group consisting of at least one of platinum and palladium.

9. The process of claim 7 wherein said molecular sieve further comprises a platinum hydrogenation component.

10. The process of claim 1, wherein said molecular sieve is a SAPO-11 crystalline silicoaluminophosphate.

11. The process of claim 9 wherein said molecular sieve further comprises a platinum hydrogenation component.

12. The process of claim 1, wherein isomerization is carried out at a temperature of from about 200° C. to about 475° C. and a pressure of from about 15 to about 2000 psig.

13. The process of claim 11, wherein said pressure is from about 50 to about 1000 psig.

14. The process of claim 10, wherein the temperature is from about 250° C. to about 450° C. and the pressure is from about 100 psig to about 600 psig.

15. The process of claim 1, wherein the isomerizing is carried out at a liquid hourly space velocity of from about 0.1 to about 20.

16. The process of claim 15, wherein the liquid hourly space velocity is from about 0.1 to about 5.

17. The process of claim 1, wherein isomerization is carried out in the presence of hydrogen.

18. The process of claim 1, further comprising hydrofinishing the isomerized lube oil.

19. The process of claim 18, wherein hydrofinishing is carried out at a temperature of from about 190° C. to about 340° C. and a pressure of from about 400 psig to about 3000 psig.

20. The process of claim 19, wherein hydrofinishing is carried out in the presence of a metallic hydrogenation catalyst.

21. The process of claim 1, wherein said waxy feed has an organic nitrogen content of less than about 50 ppmw.

22. The process of claim 21, wherein said organic nitrogen content is less than about 10 ppmw.

23. The process of claim 1, wherein the waxy feed comprises $C_{20}+$ paraffins and boils above about 230° C.

24. The process of claim 23, wherein the waxy feed boils above about 315° C.

25. The process of claim 1, wherein said molecular sieve is a ZSM-22.

26. The process of claim 25, wherein said Group VIII metal comprises a platinum hydrogenation component.

27. The process of claim 1, wherein said catalyst contains a Group IIA metal.

28. A process for producing oil comprising isomerizing a waxy feed having greater than about 50% wax over a catalyst comprising (a) an intermediate pore size nonzeolitic molecular sieve containing $AlO_2$ and $PO_2$ tetrahedral oxide units and (b) at least one Group VIII metal at a pressure of from about 15 psig to about 2000 psig, said molecular sieve having generally oval 1-D pores having a minor axis between about 4.2 Å and about 4.8 Å and a major axis between about 5.4 Å and about 7.0 Å.

29. The process of claim 28, wherein said waxy feed contains at least about 80% wax.

30. The process of claim 28, wherein said waxy feed is selected from the group consisting of gas oil stock, lubricating oil stock, synthetic oil, foots oil, slack wax, deoiled wax, normal alphaolefin wax and microcrystalline wax.

31. The process of claim 28, wherein the isomerizing is carried out at a liquid hourly space velocity of from about 0.1 to about 20.

32. The process of claim 28, further comprising hydrofinishing the isomerized lube oil.

33. A process as set forth in claim 28, wherein the waxy feed contains at least about 70% paraffinic carbon.

34. The process of claim 28, wherein said waxy feed contains at least about 80% paraffinic carbon.

35. The process of claim 28, wherein said waxy feed contains at least about 90% paraffinic carbon.

* * * * *